United States Patent
Doring et al.

(10) Patent No.: US 10,782,952 B1
(45) Date of Patent: Sep. 22, 2020

(54) GENERATING MACHINE IMAGES FROM SOFTWARE PACKAGES

(71) Applicant: Amazon Technologies, Inc., Seattle, WA (US)

(72) Inventors: Patrick Doring, Seattle, WA (US); Eugene Chang, Seattle, WA (US); Michael Sherman, Cedar Park, TX (US); Majisha Namath Parambath, Seattle, WA (US); John Christopher Mikula, Seattle, WA (US); Zhereng Zhang, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/085,727

(22) Filed: Mar. 30, 2016

(51) Int. Cl.
*G06F 9/445* (2018.01)
*G06F 8/61* (2018.01)
*G06F 9/455* (2018.01)

(52) U.S. Cl.
CPC ............ *G06F 8/63* (2013.01); *G06F 9/45558* (2013.01); *G06F 2009/4557* (2013.01)

(58) Field of Classification Search
CPC ........................................................ G06F 8/63
See application file for complete search history.

(56) References Cited

U.S. PATENT DOCUMENTS

| | | | |
|---|---|---|---|
| 9,756,070 B1* | 9/2017 | Crowell | G06F 9/45533 |
| 2009/0300604 A1* | 12/2009 | Barringer | G06F 11/3664 |
| | | | 717/178 |
| 2012/0265959 A1* | 10/2012 | Le | G06F 17/30067 |
| | | | 711/162 |
| 2013/0132950 A1* | 5/2013 | McLeod | G06F 8/63 |
| | | | 718/1 |
| 2014/0201737 A1* | 7/2014 | Mitkar | G06F 9/461 |
| | | | 718/1 |

(Continued)

OTHER PUBLICATIONS

Web article: "AWS Marketplace" published by Amazon 2016 [online][retrieved on: Mar. 4, 2016] retrieved from: http://awsmp-loadforms.slamazonaws_com/AWS_Marketplace_-_Seller_Guide.pdf, 30 pps.

(Continued)

*Primary Examiner* — Hang Pan
(74) *Attorney, Agent, or Firm* — Lee & Hayes, P.C.

(57) ABSTRACT

Technologies are disclosed for generating a machine image from a software package. A machine image build service receives a request to create a machine image, such as by way of a network services application programming interface (API). The request can include the software package and a selection of an operating system. The machine image build service utilizes a workflow service to execute a workflow for generating the machine image. The workflow causes a virtual machine instance that utilizes the specified operating system to be instantiated by an on-demand computing service. The software package is installed in the virtual machine instance. A snapshot is taken of the virtual machine to create the requested machine image. The machine image can be scanned by a network service for compliance with one or more requirements for execution in a service provider network. The machine image can also be submitted to a machine image marketplace.

20 Claims, 10 Drawing Sheets

GENERATING A MACHINE IMAGE FROM A SOFTWARE PACKAGE

(56) References Cited

U.S. PATENT DOCUMENTS

2014/0258155 A1* 9/2014 Suryanarayanan ..... H04L 63/10
    705/318
2015/0033221 A1* 1/2015 Chari .................... H04L 63/105
    718/1

OTHER PUBLICATIONS

Web article: "Building AMIs for AWS Marketplace" published by Amazon 2016 [online][retrieved on: Mar. 4, 2016] retrieved from: htttps://aws.amazon.com/marketplace/help/201231340, 3 pps.

Web article: "Creating a Custom Image" published by Google 2016 [online][retrieved on: Mar. 4, 2016] retrieved from: htps://cloud.google.com/compute/docs/creating-custom-image, 12 pps.

Web article: "deb (file format)" published by Wikipedia 2016 [online][retrieved on: Mar. 4, 2016] retrieved from: https://en.wikipedia.org/wiki/Deb_(file_format), 3 pps.

Web article: "ec2-create-image" published by Amazon 2016 [online][retrieved on: Mar. 4, 2016] retrieved from: http://doct.aws.amazon.com/AWSEC2/latest/CommandLineReference/ApiReference-cmd-CreateImage.html, 8 pps.

Web article: "Packet" published by HashiCorp 2016 [online][retrieved on: Mar. 4, 2016] retrieved from: https://www.packer.io/, 3 pps.

Troan, E. "RPM Package Manager" published by Wikipedia, 2016 [online][retrieved on Mar. 4, 2016] retrieved from: https://en.wikipedia.org/wiki/RPM_Package_Manager, 7 pps.

\* cited by examiner

GENERATING MACHINE IMAGES FROM SOFTWARE PACKAGES

BACKGROUND

Service provider networks exist that allow customers to purchase, configure, and utilize various types of computing resources on a permanent or an as-needed basis. In particular, service provider networks can expose network interfaces through which customers can access various types of network services that provide computing resources such as, but not limited to, data processing resources, data storage resources, database resources, networking resources, and data communication resources.

One type of data processing resource commonly available through service provider networks such as those described above are virtual machine instances (which might also be referred to herein as a "VM" or a "virtual machine"). A VM instance is a software implementation of a machine that executes programs like a physical machine. In order to utilize a VM, a customer or other user of a service provider network typically has to specify or provide a virtual machine image (which might be referred to herein as a "machine image" or a "VM image"). A machine image is a software image that describes aspects of a VM, such as hardware devices present in the VM, stores the contents of a VM's random access memory ("RAM"), and includes one or more virtual disks, which are commonly utilized to store an operating system, programs, and data for use by the VM.

In some service provider networks, a number of pre-defined machine images are offered to customers or other users for use with their own VMs. It can, however, be a complex and time consuming process for a user to customize a pre-defined machine image for their particular use. As a result, users frequently create machine images that are not properly configured for use with the service provider network with which they are to be utilized.

The disclosure made herein is presented with respect to these and other considerations.

DETAILED DESCRIPTION

Figure 1:
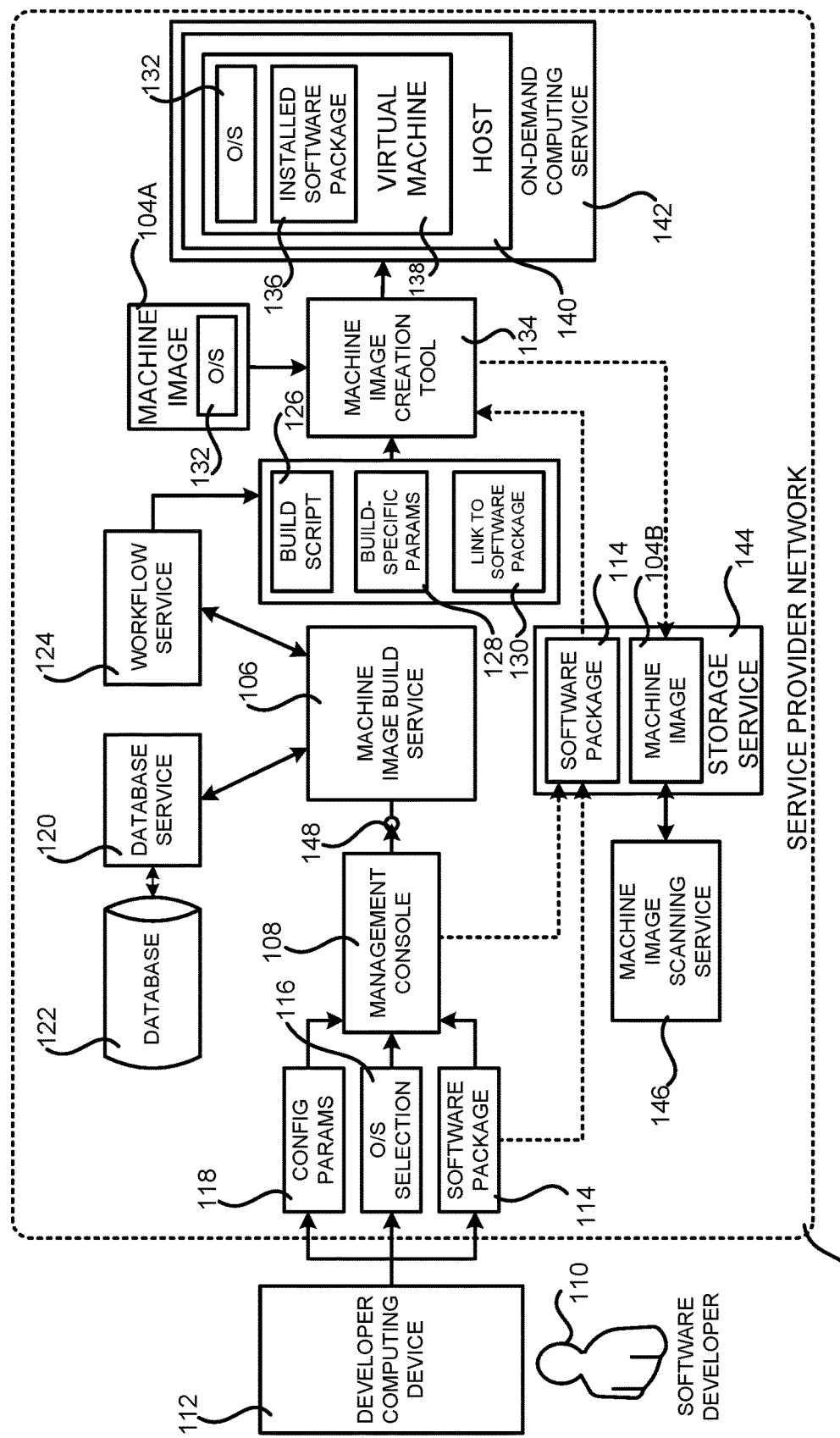
FIG. 1 is a software and network architecture diagram showing aspects of the configuration and utilization of a machine image build service disclosed herein, according to one particular configuration.
Figure 2A:
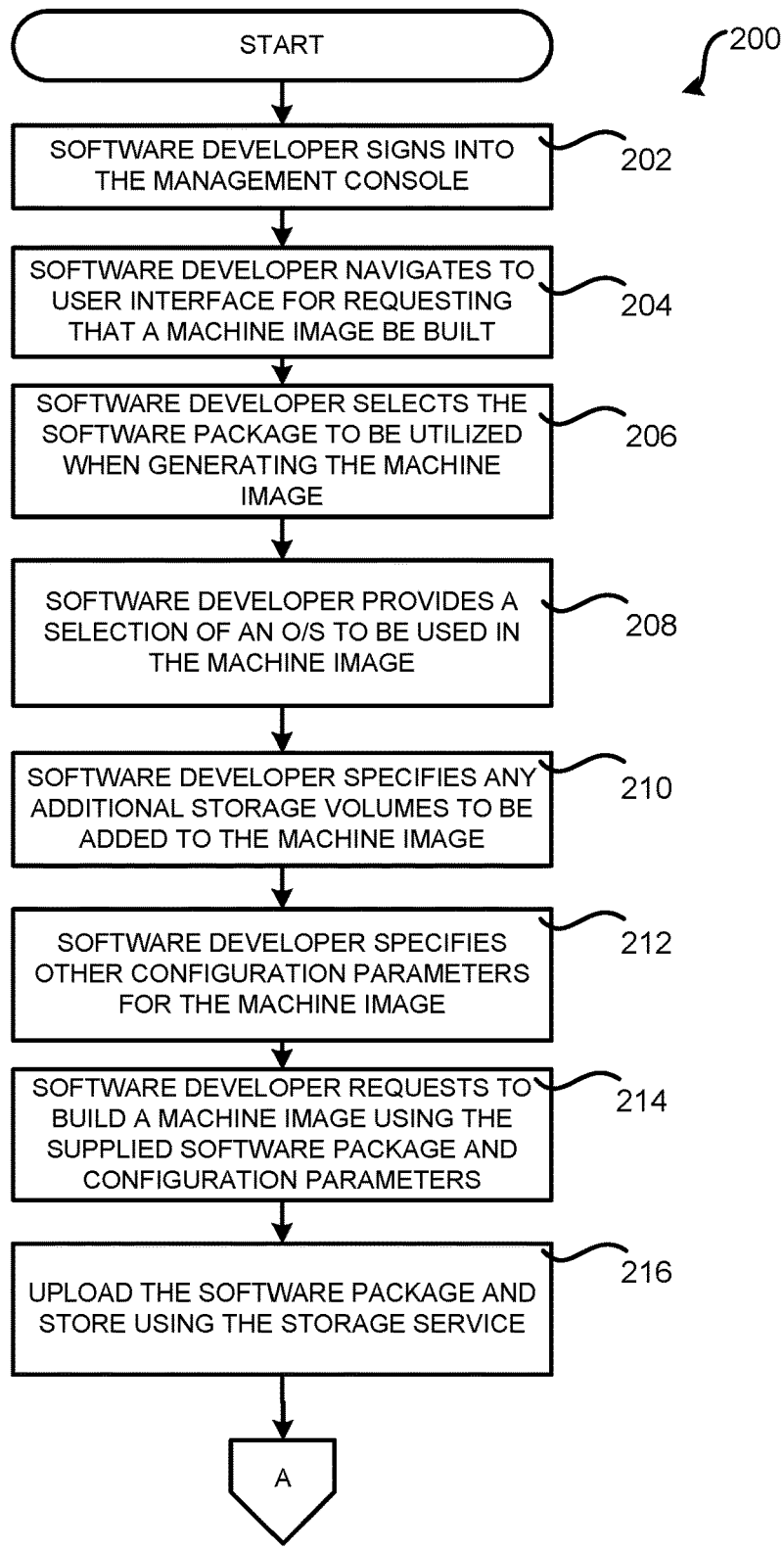
FIGS. 2A-2D are flow diagrams showing a routine that illustrates aspects of the operation of the machine image build service shown in FIG. 1, according to one particular configuration.
Figure 2B:
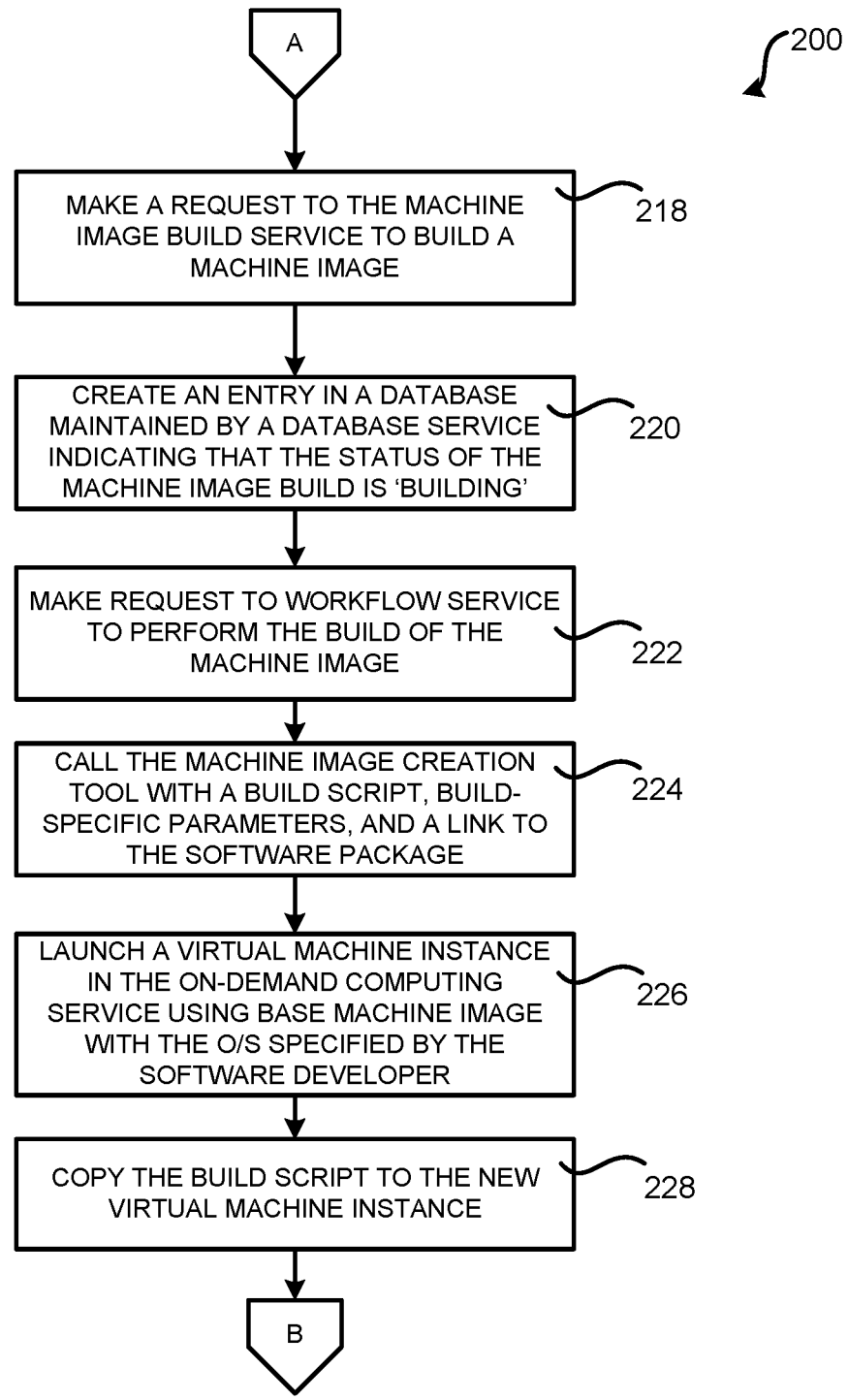
Figure 2C:
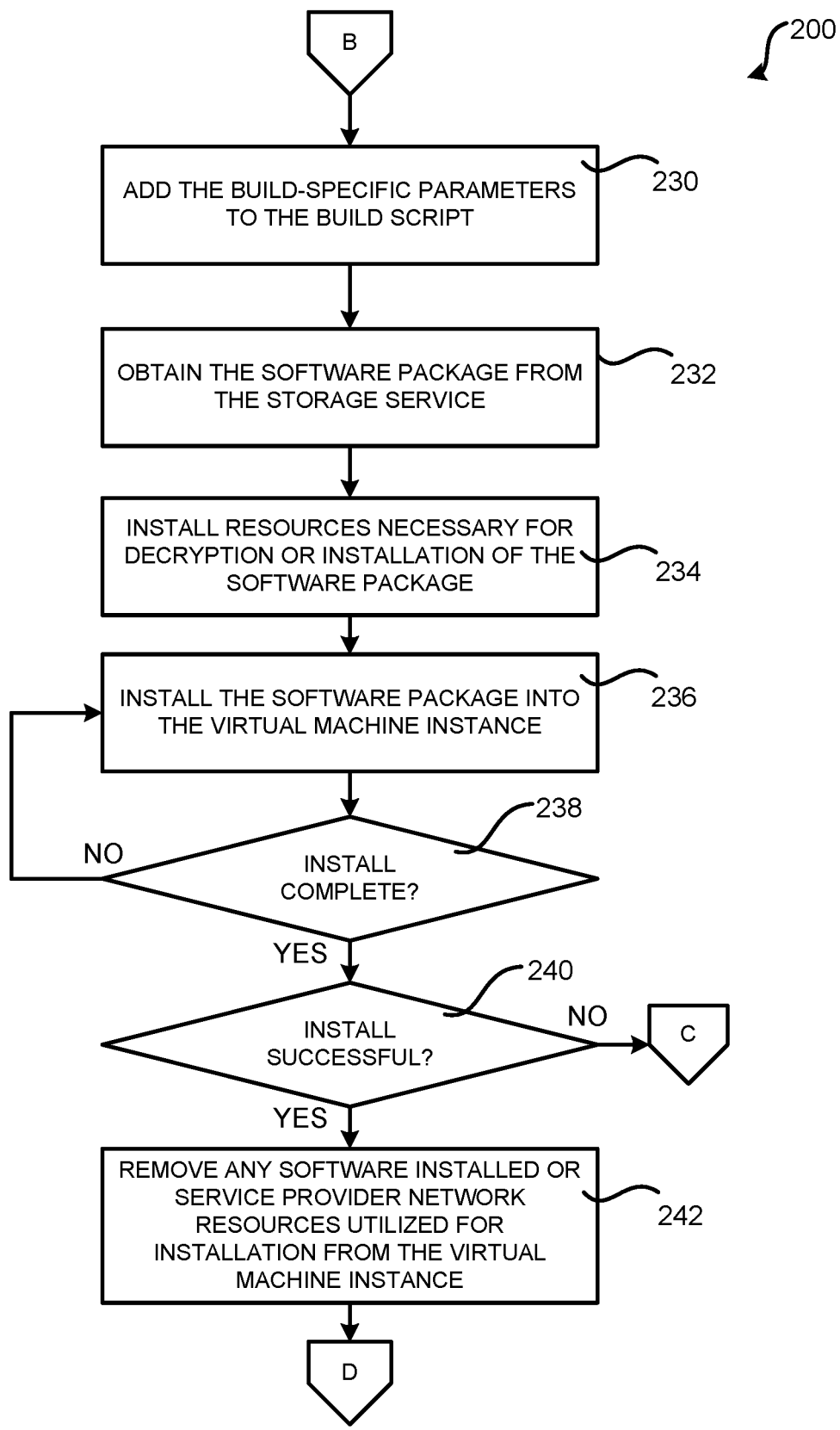
Figure 2D:
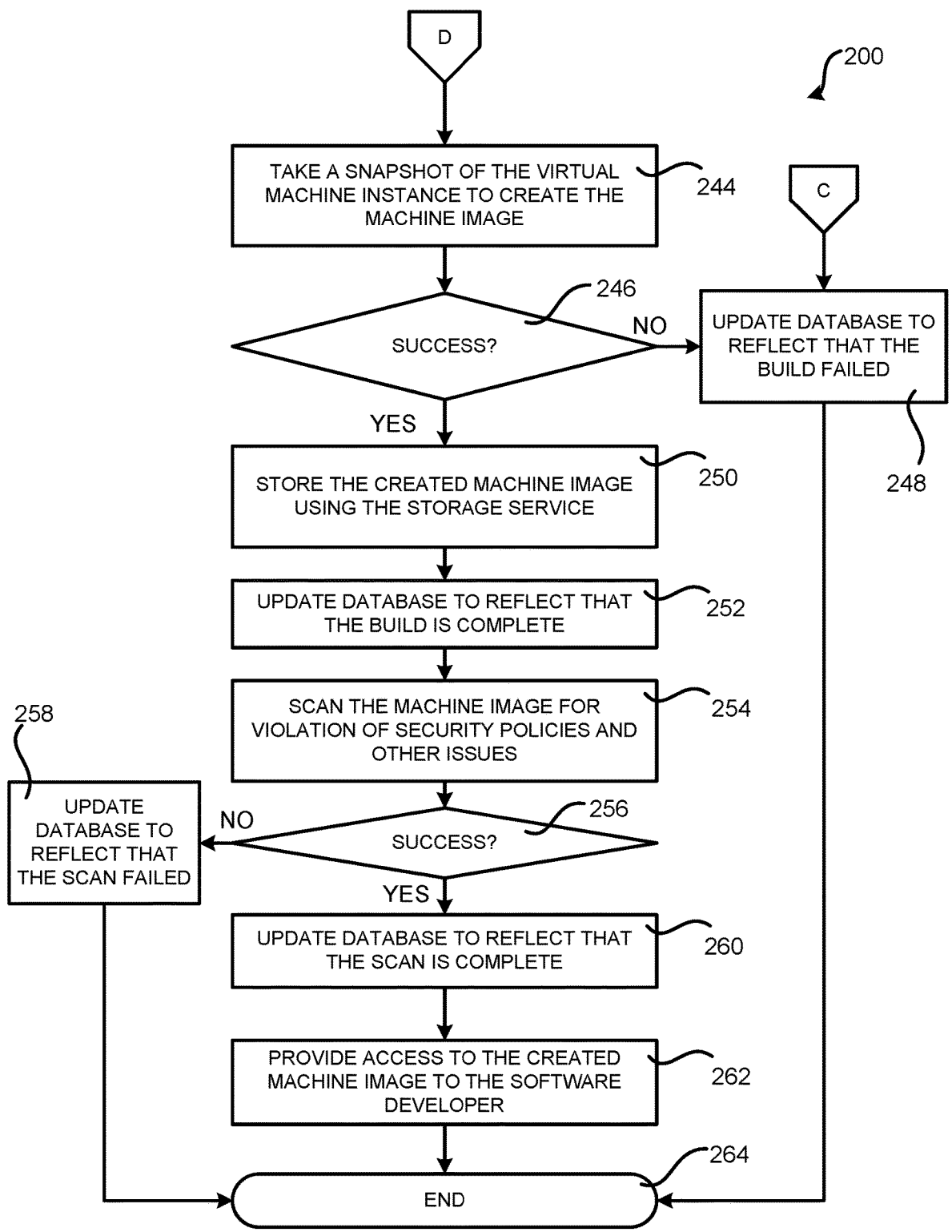

The following detailed description is directed to technologies for generating machine images from software packages. Through an implementation of the disclosed technologies, a machine image that is fully compatible with the requirements of a service provider network can be quickly generated utilizing only a user-provided software package and a small number of configuration parameters, such as an indication of the operating system (which might be referred to herein as an "OS" or an "O/S") to be utilized by the machine image. In this way, significant time and computing resources can be saved as compared to previous techniques for creating machine images. Technical benefits other than those specifically mentioned herein can also be realized through an implementation of the technologies disclosed herein.

In order to enable the functionality disclosed herein, a machine image build service is provided in one configuration. The machine image build service is a network service that executes in a service provider network that is configured to provide computing resources on a permanent or an as-needed basis. Among other types of functionality, the computing resources provided by the service provider network can be utilized to implement the various network services described herein. The computing resources provided by the service provider network can include various types of computing resources, such as data processing resources like VM instances, data storage resources, networking resources, data communication resources, network services, and the like.

In one particular configuration, a management console is also provided that provides a graphical user interface ("GUI") for accessing the functionality provided by the machine image build service. For example, the management console can provide a GUI through which a user, such as a software developer or an independent software vendor ("ISV"), can submit a request to generate a machine image using a software package. In particular, the GUI can receive the software package or a link to the software package, such as the network location of the software package, and the identification of an operating system to be utilized by the machine image that is to be created. The GUI can also receive other configuration parameters for the machine image including, but not limited to, a parameter indicating that the machine image is to be configured to access one or more storage volumes provided by a storage service executing in the service provider network. The management console can also submit the request to create the machine image to the machine image build service via a network services application programming interface ("API") exposed by the machine image build service. Other types of interfaces can also be utilized.

Responsive to receiving such a request, the machine image build service is configured to instruct a workflow service, also executing in the service provider network, to execute a workflow for creating a machine image from the software package. In one configuration, the workflow causes a machine image creation tool to instantiate a new VM instance utilizing an on-demand computing service, which also executes in the service provider network. The machine image creation tool also causes the software package identified by the request to be installed in the new VM instance. The VM instance can also be configured according to other specified configuration parameters, such as configuring the VM instance to utilize one or more storage volumes. The VM instance can also be configured in other ways. A snapshot can then be taken of the VM instance in order to generate the requested machine image. The machine image is stored by a storage service, which also executes in the service provider network, in some configurations.

In some configurations, the newly created machine image is also scanned by a machine image scanning service, also executing in the service provider network, for compliance with requirements associated with the service provider network. For example, and without limitation, a machine image may be required to satisfy certain security requirements in order to be executed in the service provider network or offered for sale or use on a machine image marketplace. If the machine image passes the scan, the machine image may be submitted to such a machine image marketplace, which might also be provided by hardware and software components in the service provider network. Additionally, the requesting user can be provided access to the machine image. The user can then instantiate a new VM instance using the machine image to test whether the machine image build service created the machine image correctly.

In some configurations, a database service, also executing in the service provider network, is utilized to maintain an entry in a database that defines the current status of the processing of the request to create the machine image. For example, and without limitation, when the creation of a new machine image has started, the entry may be set to indicate that the machine image is 'building.' If a failure occurs during the building of the machine image, the entry may be set to indicate that building of the machine image has 'failed.' If a failure occurs during the scan of the newly created machine image, the entry can be set to indicate that the 'scan failed.'

Other types of status messages regarding the state of the building of a machine image can also be stored in the database. This information can be presented to the user through the management console GUI or made available to the user in another manner. Additional details regarding the various components and processes described briefly above for generating machine images from software packages will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software architecture diagram showing aspects of the configuration and utilization of a machine image build service 106 disclosed herein, according to one particular configuration. As shown in FIG. 1, the machine image build service 106 executes in a service provider network 102 (which might be referred to herein as the "SPN 102") in one particular configuration.

As discussed briefly above, the service provider network 102 is a computing network configured to provide computing resources on a permanent or an as-needed basis. Among other types of functionalities, the computing resources provided by the service provider network 102 can be utilized to implement the various network services described herein, such as the machine image build service 106. The computing resources provided by the service provider network 102 can include various types of computing resources, such as data processing resources like VM instances, data storage resources, networking resources, data communication resources, network services, and the like.

A customer or potential customer of the service provider network 102, such as the software developer 110, can utilize an appropriate computing system, such as the developer computing device 112, to communicate with the service provider network 102 over an appropriate data communications network (not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102, such as the developer computing device 112, can be utilized to purchase computing resources in the service provider network 102, to configure aspects of the operation of the computing resources through a management console 108 or other type of interface, to access and utilize functionality provided by the various services and systems described herein, and/or to perform other types of functionality with regard to the operation of the computing resources provided by the service provider network 102.

The developer computing device 112 can be any type of computing device capable of connecting to the service provider network 102 via a suitable data communications network such as, but not limited to, a laptop or desktop computer, a tablet computing device, a server computer, or a smartphone. Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 4-7.

As discussed briefly above, the service provider network 102 can also be configured to execute various types of network services. For example, and without limitation, the service provider network 102 can execute the machine image build service 106, the on-demand computing service 142, the database service 120, the workflow service 124, and the storage service 144. Each of these network services will be described in greater detail below.

As also discussed briefly above and in greater detail below, a management console 108 is also provided in one configuration that provides a GUI for accessing the functionality provided by the machine image build service 106. For example, the management console can provide a GUI (not shown in FIG. 1) through which a user, such as the software developer 110 or an ISV (not shown in FIG. 1), can submit a request to generate a machine image 104B using a software package 114. In particular, the GUI provided by the management console 108 can receive the software package 114 or a link to the software package 114, such as the network location of the software package 114, and the identification 116 of an operating system 132 to be utilized by the machine image 104B that is to be created. Once received, the software package 114 can be copied to a location in the storage service 114, or another network location accessible to the machine image creation tool 134, which is described in detail below.

In various configurations, the machine image build service 106 can utilize software packages 114 created according to various standard package formats. For example, and without limitation, in one configuration the software package 114 is a DEBIAN package (sometimes referred to as a "DEB" package). A DEBIAN package is a standard UNIX archive that includes two optionally compressed TAR archives. One archive holds control information and another contains the actual program data. In another configuration, the software package 114 is an RPM package manager ("RPM") package. DEBIAN packages and RPM packages are appropriate when the specified O/S is a LINUX-based O/S. When the specified O/S is one of the operating systems in the MICROSOFT WINDOWS family of operating systems, the software package can be configured as an MSI installer package. Other types of package formats can be utilized for the software package 114 in other configurations.

The GUI provided by the management console 108 can also receive other configuration parameters 118 for the machine image 104B to be created including, but not limited to, a parameter indicating that the machine image 104B is to be configured to access one or more storage volumes provided by a storage service 144 executing in the service provider network 102. Various attributes of the storage volumes can also be defined such as, but not limited to, the device mapping for the volumes, the capacity of the volumes, whether the volumes are general purpose, provisioned, IOPs, or magnetic, and, potentially, other attributes. Other types of configuration parameters 118 can be specified for the machine image 104B to be built in other configurations.

The management console 108 can also submit the request to create the machine image 104B to the machine image build service 106 via a network services API 148 exposed by the machine image build service 106. Other types of interfaces, such as a command line interface ("CLI") can be utilized in other configurations. Responsive to receiving such a request, the machine image build service 106 is configured to instruct a workflow service 124, also executing in the service provider network 102, to execute a workflow (not shown in FIG. 1) for creating a machine image 104B from the software package 114.

In one particular configuration, execution of the workflow by the workflow service 124 causes a machine image creation tool 134 to instantiate a new VM 138 on a host computer 140 (which might be referred to herein as the "host 140") provided by an on-demand computing service 142, which also executes in the service provider network 102. Although not illustrated in FIG. 1, the host 140 can be configured to execute a virtual machine manager ("VMM") in one configuration. A VMM permits multiple, independent guest operating systems to concurrently execute on a single host computer 140. To enable this functionality, the VMM abstracts the hardware of the host computer 140 to create one or more VMs, such as the VM 138. The VMM may be implemented in the hardware of the host computer 140 or it may be implemented as a software module that executes at a low-level in the host computer 140 to provide services to VMs. In one implementation, the VMM is a hypervisor. Other types of VMMs might also be utilized in other implementations. In this regard, it should be appreciated that the configurations disclosed herein can be utilized with other types of machine images, such as DOCKER images and/or containers. The term "machine image" as used herein is intended to encompass such implementations.

As mentioned briefly above, the guest operating systems managed by a VMM are commonly encapsulated in a virtual machine image, such as the machine images 104A and 104B (which might be referred to herein as a "machine image 104" or the "machine images 104"). A machine image 104 typically describes aspects of a VM, such as hardware devices present in the virtual machine, stores the contents of a virtual machine's RAM, and can include one or more virtual disks. The virtual disks, which might also be known as virtual disk images, encapsulate a filesystem, such as those typically utilized by physical storage devices. For instance, a virtual disk might encapsulate a file allocation table ("FAT") filesystem. Similarly, a virtual disk might encapsulate another type of filesystem, such as a UNIX-based filesystem. Other types of filesystems might also be utilized in other virtual disks.

The filesystems in the virtual disks contained in a machine image 104 might be utilized to store an operating system 132, application programs, other types of programs, and data. For instance, in the example shown in FIG. 1, the filesystem of a virtual disk contained in the machine image 104A includes an operating system 132 that is utilized to boot and execute the VM 138 defined by the machine image 104A. Moreover, in the example shown in FIG. 1, the contents of the machine image 104A, including the O/S 132, have been configured to be compliant with any requirements imposed on machine images 104 that are executed in the service provider network 102 or for listing on a machine image marketplace (not shown in FIG. 1), which is discussed in detail below. For instance, the O/S 132 can be configured to meet security requirements imposed by the service provider network 102, such as a requirement that certain network ports be open or closed. The machine image 104A can also be configured in other ways to ensure compliance with all requirements imposed on machine images 104 by the service provider network 102 or its operator.

The machine image creation tool 134 also causes the software package 114 identified by the request to be installed in the new VM instance 138 (shown in FIG. 1 as the installed software package 136). For example, and without limitation, in one particular configuration, the workflow service 124 provides the machine image creation tool 134 with a build script 126 and a link 130 to the location of the software package 114 in the storage service 144. The machine image creation tool 134 can utilize the link 130 to obtain the software package 114, such as from the storage service 144, and to copy the software package 114 to the VM 138.

The machine image creation tool 134 can also modify the build script 126 with any parameters (shown in FIG. 1 as the build-specific parameters 128) that are specific to the particular machine image 104B being created. For example, and without limitation, the build-specific parameters 128 might be utilized to configure the VM 138, and the machine image 104B created from the VM 138, to access certain storage volumes exposed by the storage service 144. The build-specific parameters 128 can also be utilized to customize the configuration of the machine image 104B in other ways in other configurations. Once the build script 126 has been modified in this manner, the build script 126 can be executed in order to install the software package 114 in the VM 138.

Once the software package 114 has been installed in the VM 138, the machine image creation tool 134 can cause a snapshot to be taken of the VM instance 138 in order to generate the requested machine image 104B. The machine image 104B is then stored by the storage service 144, within the on-demand computing service 142, or in another network-accessible location.

In some configurations, the newly created machine image 104B is also scanned by a machine image scanning service 146, also executing in the service provider network 102, for compliance with the requirements for a machine image 104 for execution in the service provider network 102 described above. As discussed above, for example, a machine image 104 may be required to satisfy certain security requirements in order to be executed in the service provider network 102 or offered for sale or use on a machine image marketplace.

The machine image scanning service 146 can also scan the machine image 104B for compliance with other types of requirements including, but not limited to, ensuring that the machine image 104B does not include default passwords, security credentials, or authorization keys, ensuring that the machine image 104B does not include any known vulnerabilities, viruses or other types of malware, ensuring that root login is not available in the machine image 104B, and/or that the machine image 104B allows OS-level administration capabilities to allow for compliance requirements, vulnerability updates and log file access. For LINUX-based machine images 104 this is through SSH and for WINDOWS-based machine images 104 this is normally through RDP.

If the machine image 104B passes the scan, the machine image 104B may be submitted to such a machine image marketplace (described in greater detail with regard to FIG. 3), which might also be provided by hardware and software components in the service provider network 102. Additionally, the requesting user (e.g. the software developer 110) can be provided access to the machine image 104B. The user can then instantiate a new VM instance in the on-demand computing service 142 using the machine image 104B to test whether the machine image build service 106 created the machine image 104B correctly.

In some configurations, a database service 120, also executing in the service provider network 102, is utilized to maintain an entry in a database 122 or another type of data store that defines the current status of the processing of the request to create the machine image 104B. For example, and without limitation, when the creation of a new machine image 104B has started, the entry in the database 122 may be set to indicate that the machine image 104B is 'building.' If a failure occurs during the building of the machine image 104B, the entry in the database 122 may be set to indicate that building of the machine image 104B has 'failed.' If a failure occurs during the scan of the newly created machine image 104B by the machine image scanning service 146, the entry in the database 122 can be set to indicate that the 'scan failed.'

Other types of status messages regarding the state of the building of a machine image 104B can also be stored in the database 122 in a similar fashion. This information can be presented to the user that requested the build of the machine image 104B (e.g. the software developer 110) through the GUI provided by the management console 108 or made available to the user in another manner (e.g. through the API 148). Additional details regarding the various services shown in FIG. 1 and their operation will be described below with regard to FIGS. 2A-2D and 3.

FIGS. 2A-2D are flow diagrams showing a routine 200 that illustrates aspects of the operation of the machine image build service 106 shown in FIG. 1 and described above. It should be appreciated that the logical operations described herein with respect to FIGS. 2A-2D, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where a user, such as the software developer 110, signs into the management console 108. Appropriate credentials can be provided to the software developer 110 in order to provide secure access to the management console 108 and the various computing resources in the service provider network 102 that are available to the software developer 110. The routine 200 then proceeds to operation 204.

At operation 204, the software developer 110 navigates to the GUI provided by the management console 108 to request that a new machine image 104B be created based upon a software package 114. As discussed above, the GUI can allow the software developer 110 to select the software package 114 to be utilized during the build of the machine image 104B. The software developer 110 can also provide the identification 116 of an operating system 132 to be utilized in the new machine image 104B. The software developer 110 can also provide additional configuration parameters 118 to be used during the creation of the machine image 104B such as, but not limited to, any additional storage volumes provided by the storage service 144 that are to be accessible by the machine image 104B when executed. The software developer 110 makes these selections at operations 206, 208, 210, and 212 of the routine 200, respectively.

From operation 212, the routine 200 proceeds to operation 214, where the software developer 110 requests a new machine image 104B be built using the software package 114 identified at operation 206 and the other parameters identified at operations 208, 210, and 212. In response thereto, the software package 114 is uploaded to the storage service 144 at operation 216. In other configurations, the software package 114 is already stored in the storage service 144 and the developer 110 only needs to provide a link to the software package 114 at operation 206.

From operation 216, the routine 200 proceeds to operation 218, where the management console 108 makes a request to the machine image build service 106 to build the machine image 104B. In one configuration, the request is made by way of a network services API 148 exposed by the machine image build service 106. The request can include, for example, a reference to the software package 114, data identifying the O/S 132 or base machine image 104A to be used, the configuration parameters 118, a description of the machine image 104B, and potentially other information. Other types of interfaces can be utilized in other configurations, such as a CLI.

Responsive to receiving the request to build a new machine image 104B at operation 218, the machine image build service 106 interacts with the database service 120 at operation 220 to create an entry in the database 122 corresponding to the build request. The entry in the database 122 is then set to indicate that the new machine image 104B is 'building.' The database service 120 can expose a suitable network services API for creating and managing the contents of the database 122. As mentioned above, the status information stored in the database 122 for the build request can be provided to the software developer 110 in the management console 108 or in another manner in other configurations.

From operation 220, the routine 200 proceeds to operation 222, where the machine image build service 106 makes a request to the workflow service 124 to perform a build of the machine image 104B. The machine image build service 106 can pass parameters to the workflow service 124 identifying the software package 114, the machine image 104A to utilize, the configuration parameters 118, and potentially others. In turn, the workflow service 124 begins executing a workflow for creating the machine image 104B at operation 224. In particular, and as described above, the workflow calls the machine image creation tool 134. The build script 126, build-specific parameters 128, and a link 130 to the software package 114 in the storage service 144 can also be provided to the machine image creation tool 134. In one particular configuration, the machine image creation tool 134 is the open source PACKER tool for creating machine and container images from HASHICORP. Other similar tools can be utilized in other configurations.

From operation 224, the machine image creation tool 134 causes a new VM 138 to be created in the on-demand computing service 142. The on-demand computing service 142 can expose an appropriate network services API for creating and managing VMs. The new VM 138 is instantiated using a machine image 104A containing the O/S 132 requested by the software developer 110. As also mentioned above, the machine image 104A is also configured for compliance with any requirements for executing a machine image 104 in the service provider network 102. The machine image 104A can be provided by the operator of the service provider network 102 or, in some configurations, by the user of the machine image build service 106 (e.g. the software developer 110 in the example shown in FIG. 1).

From operation 226, the routine 200 proceeds to operation 228, where the machine image creation tool 134 copies the build script 126 to the new VM 138. The routine 200 then proceeds to operation 230, where the build-specific parameters 128 are added to the build script 126. In this way, the build script 126 can be customized for building the machine image 104B.

From operation 230, the routine 200 proceeds to operation 232, where the software package 114 is obtained from the storage service 144 and copied to the VM instance 138. The routine 200 then proceeds to operation 234, where any resources necessary for the installation of the software package 114 are also obtained and copied to the VM instance 138. For example, and without limitation, software for decompressing or decrypting the software package 114 can be obtained and copied to the VM instance 138. Other types of software can also be copied to and/or installed into the VM instance 138 at operation 234.

From operation 234, the routine 200 proceeds to operation 236, where the software package 114 is installed into the VM instance 138. Once installation has completed (or stopped for some reason), the routine 200 proceeds from operation 238 to operation 240, where a determination is made as to whether the installation of the software package 114 was successful. If the installation of the software package 114 was successful, the routine 200 proceeds from operation 240 to operation 242, where any software installed (e.g. at operations 228 and 234) or any service provider network 102 resources utilized for installing the software package 114 are removed from the VM instance 138. The routine 200 then proceeds from operation 242 to operation 244.

At operation 244, the machine image creation tool 134 causes a snapshot to be taken of the VM instance 138 with the installed software package 136 in order to create the machine image 104B. Taking a snapshot involves capturing the current state of the VM instance 138 including the state of its virtual drives.

If the creation of the snapshot fails, or if the installation of the software package 114 was determined to be unsuccessful at operation 240, the routine 200 continues to operation 248. At operation 248, the entry in the database 122 is updated to reflect that the build of the machine image 104B has failed. As discussed above, this information can be provided to the software developer 110 through the GUI provided by the management console 108 or in another manner. The routine 200 then proceeds from operation 248 to operation 264, where it ends.

If the creation of the snapshot is successful, the routine 200 proceeds from operation 246 to operation 250, where the machine image 104B generated from the snapshot of the VM instance is stored at the storage service 144 or another network-accessible location. The routine 200 then proceeds to operation 252, where the database 122 can be updated to indicate that the build of the machine image 104B is 'complete.'

From operation 252, the routine 200 can proceed to operation 254, where the machine image scanning service 146 can perform a scan of the generated machine image 104B to determine whether the machine image 104B complies with requirements associated with the service provider network 102. For example, and as described above, the machine image 104B can be scanned for violation of security policies and/or other issues that would prevent the machine image 104B from being executed in the service provider network 102. In order to perform the scan, the machine image scanning service 146 might access the file system of the machine image 104B to examine its contents or might instantiate a new VM instance using the machine image 104B to inspect aspects of its operation for compliance with the requirements of the service provider network 102. Other types of analyses can also be performed on the machine image 104B.

If the scan of the machine image 104B performed at operation 254 is not successful (i.e. the machine image 104B does not comply with requirements for execution in the service provider network 102 or submission to a machine image marketplace), the routine 200 proceeds from operation 256 to operation 258. At operation 258, the database 122 is updated to reflect that scanning of the machine image 104B has failed. The routine 200 then proceeds from operation 258 to operation 264, where it ends.

If, at operation 256, it is determined that the scan of the machine image 104B has passed, the routine 200 proceeds from operation 256 to operation 260. At operation 260, the database 122 is updated to reflect that scanning of the machine image 104B has passed. The routine 200 then proceeds from operation 260 to operation 262, where access to the created machine image 104B can be provided to the software developer 110. In some configurations, access to the machine image 104B is provided to the software developer 110 in parallel with the scan of the machine image 104B performed at operation 254. The software developer 110 can then utilize the machine image 104B to instantiate a new VM instance in the on-demand computing service 142 in order to determine whether the machine image 104B was created correctly. From operation 262, the routine 200 proceeds to operation 264, where it ends.

Figure 3:
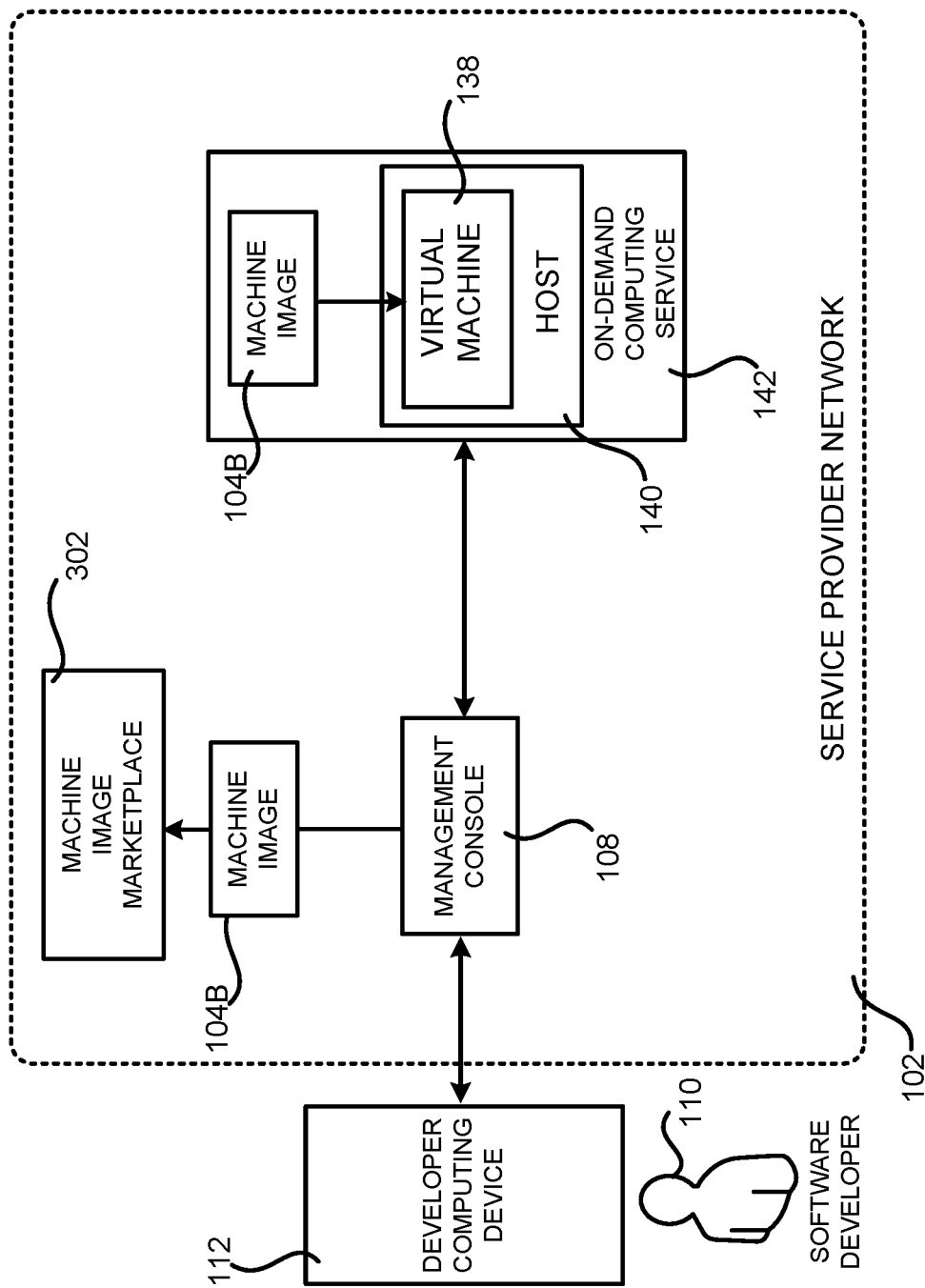
FIG. 3 is a software and network architecture diagram showing several scenarios in which a machine image created utilizing the technologies disclosed herein can be utilized, according to one particular configuration.

FIG. 3 is a software and network architecture diagram showing several scenarios in which a machine image 104B created utilizing the technologies disclosed herein can be utilized, according to one particular configuration. In particular, and as discussed briefly above, once the machine image 104B has been built, access to the machine image 104B can be provided to the software developer 110. The software developer 110 can then utilize the machine image 104B to instantiate a new VM instance in the on-demand computing service 142. In the example shown in FIG. 3, for instance, the software developer 110 has utilized the management console 108 to instantiate a new virtual machine instance 138 on a host 140 in the on-demand computing service 142. Once the VM instance 142 has been instantiated, the software developer 110 can access the VM instance 138 in order to determine whether the machine image 104B was created correctly and/or to perform other types of tests.

Once the software developer 110 is satisfied that the machine image 104B is operating as intended (and once the scan of the machine image 104B has been completed successfully), the machine image 104B can be submitted for inclusion in an electronic machine image marketplace 302. The electronic machine image marketplace 302 may then make the submitted machine image 104B available to customers (e.g. other users of the service provider network 102).

A customer may access the electronic machine image marketplace 302 to browse and acquire machine images 104 made available in the marketplace by the ISVs, other software providers, or the operator of the machine image marketplace 302. A customer, using a suitable computing device, can browse the machine images 104 available from the machine image marketplace 302, acquire a desired machine image 104, and launch the machine image 104 in the on-demand computing service 142.

In one configuration, the machine image marketplace 302 is implemented using several physical or virtual computer systems that are interconnected using one or more networks. One or more such computer systems can be configured to facilitate submission of software products by ISVs, or other software providers and browsing and acquisition by customers of software products offered through the machine image marketplace 302. Accordingly, a software provider such as an ISV, utilizing an appropriate computing device, may submit one or more machine images 104B to the machine image marketplace 302.

The submitted machine image 104B can then be included in a catalog (not shown in FIG. 3) of available machine images 104. Such a catalog can include information on machine images 104 submitted from different ISVs and, potentially, on machine images 104 made available by the operator of the machine image marketplace 302 and/or the service provider network 102. Accordingly, the machine image marketplace 302 can obtain machine images 104 from ISVs and make the machine images 104 available to a customer from a single network resource, such as a Web site.

Illustratively, the machine image marketplace 302 can generate one or more user interfaces through which a customer, utilizing a suitable computing device, can browse available machine images 104, submit queries for matching machine images 104 and view information and details regarding specific machine images 104. A customer may then acquire a machine image 104 from the electronic marketplace and launch the machine image 104 in a hosted computing environment (e.g., the service provider network 102) in a single interaction or order placed with the machine image marketplace 302. It should be appreciated that the scenarios described above are merely illustrative and that machine images 104 generated using the technologies disclosed herein can be utilized in other ways not specifically identified herein.

It should be appreciated that, in one configuration, the software packages 114 uploaded to the service provider network 102, as described above, can be saved for later use in creating an updated machine image 104 at a later time. For example, the process described above could be utilized to automatically generate an updated machine image 104 following the issuance of security patches to an operating system utilized by the original machine image 104. In this manner, the system disclosed herein can automatically ensure that seller-provided software available through the machine image marketplace 302 is running with the latest security patches, for example. This also reduces the burden on the listing ISVs, when large-scale security vulnerabilities are identified.

Figure 4:
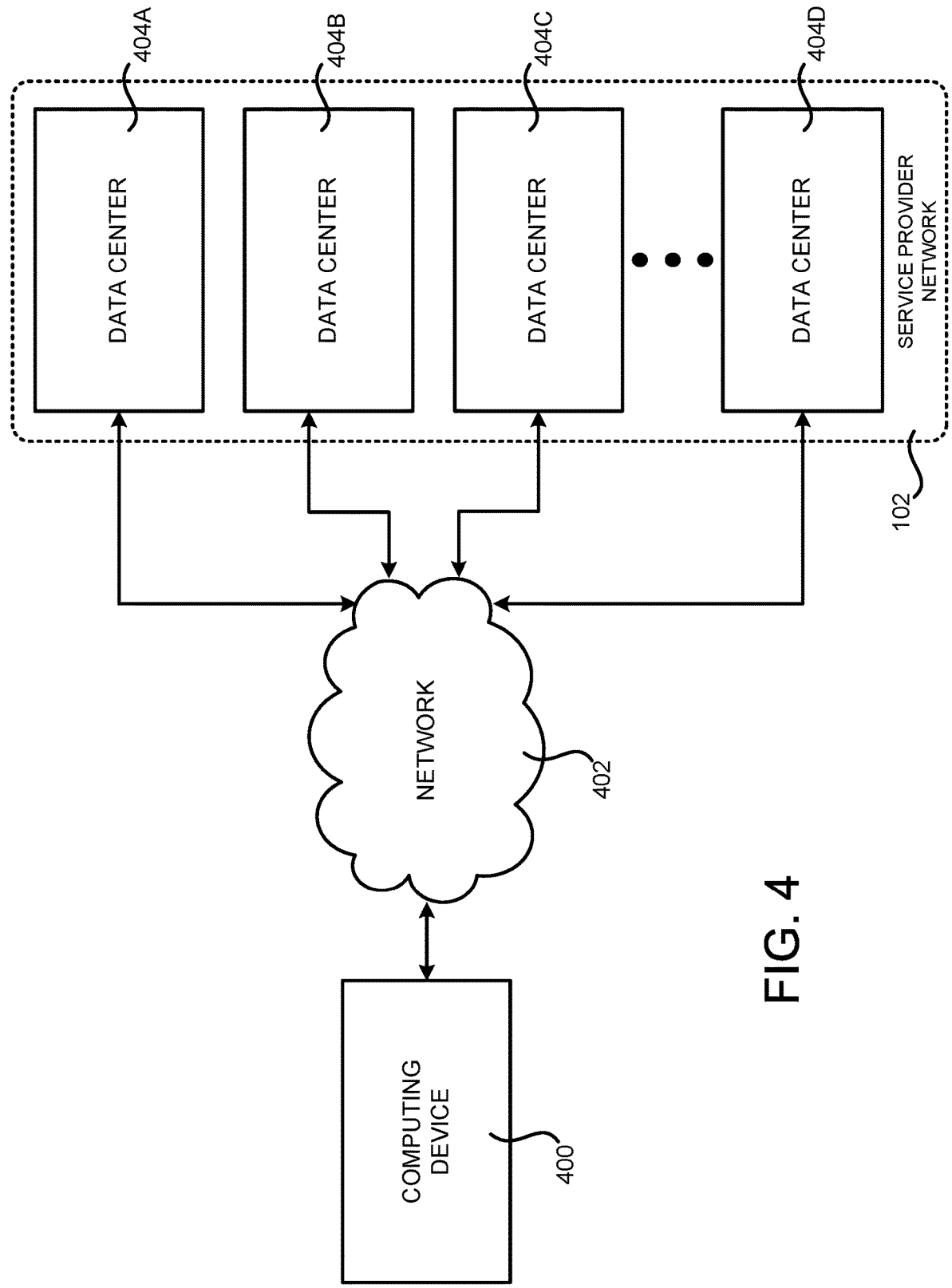
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to execute the machine image build service 106 in the manner described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data processing resources, such as VM instances, data storage resources, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 404A-404D (which might be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 102, such as the developer computing device 112, can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
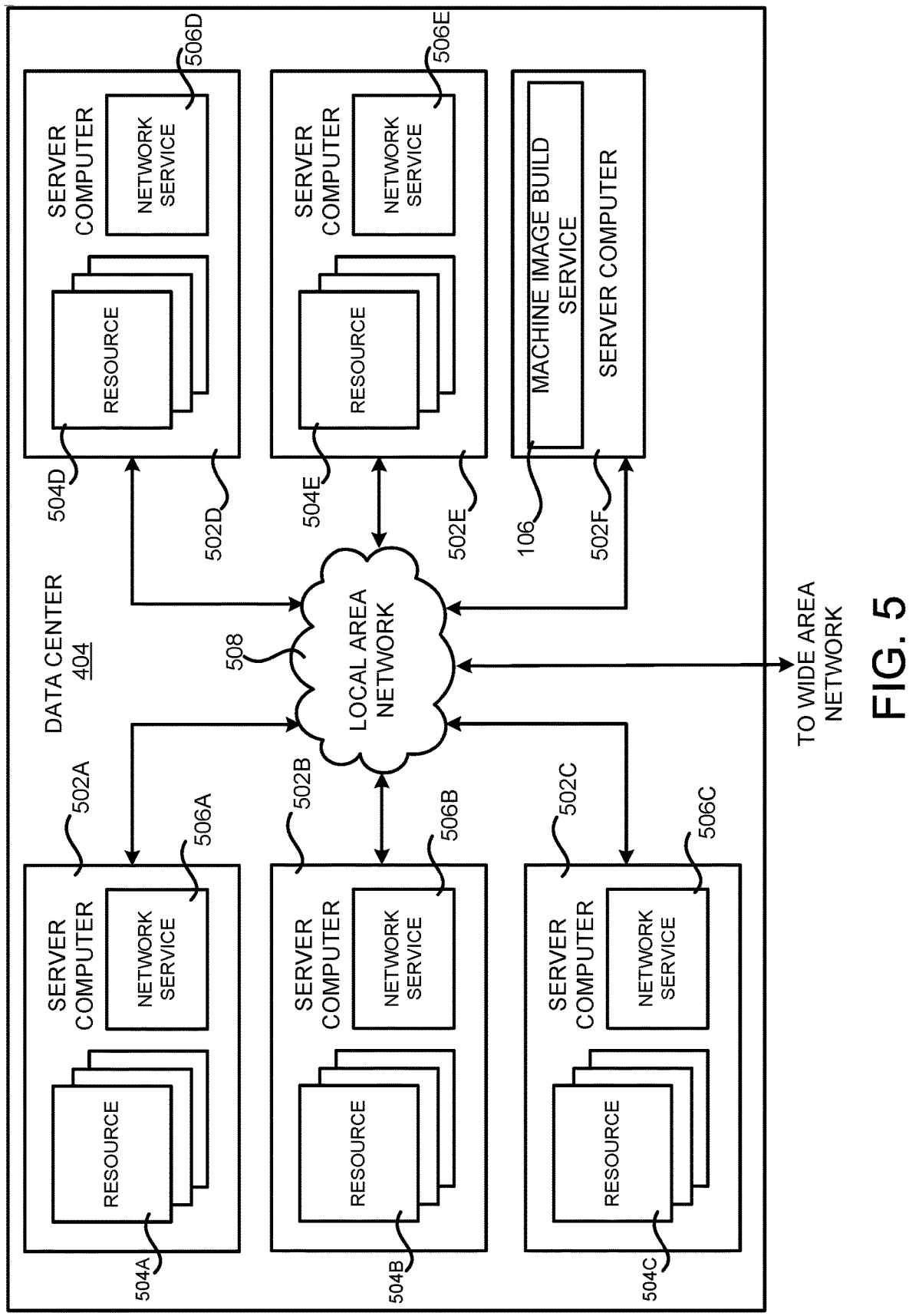
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the machine image build service 106 and the other network services disclosed herein. The example data center 404 shown in FIG. 5 includes several server computers 502A-502F (which might be referred to herein singularly as "a server computer 502" or in the plural as "the server computers 502") for providing the computing resources 504A-504E.

The server computers 502 can be standard tower, rackmount, or blade server computers configured appropriately for providing the various computing resources described herein (illustrated in FIG. 5 as the computing resources 504A-504E). As mentioned above, the computing resources 504 provided by the service provider network 102 can be data processing resources such as VM instances or hardware computing systems, data storage resources, database resources, networking resources, and others. Some of the servers 502 can also be configured to execute network services 506A-506E, respectively, capable of instantiating, providing and/or managing the computing resources 504, some of which are described in detail below with regard to FIG. 6.

The data center 404 shown in FIG. 5 also includes a server computer 502F that can execute some or all of the software components described above. For example, and without limitation, the server computer 502F can be configured to execute the machine image build service 106, which was described in detail above. The server computer 502F can also be configured to execute other components and/or to store data for providing some or all of the functionality described herein. In this regard, it should be appreciated that components or different instances of the machine image build service 106 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 404A-404D, between each of the server computers 502A-502F in each data center 404, and, potentially, between computing resources 504 in each of the data centers 404. It should be appreciated that the configuration of the data center 404 described with reference to FIG. 5 is merely illustrative and that other implementations can be utilized.

Figure 6:
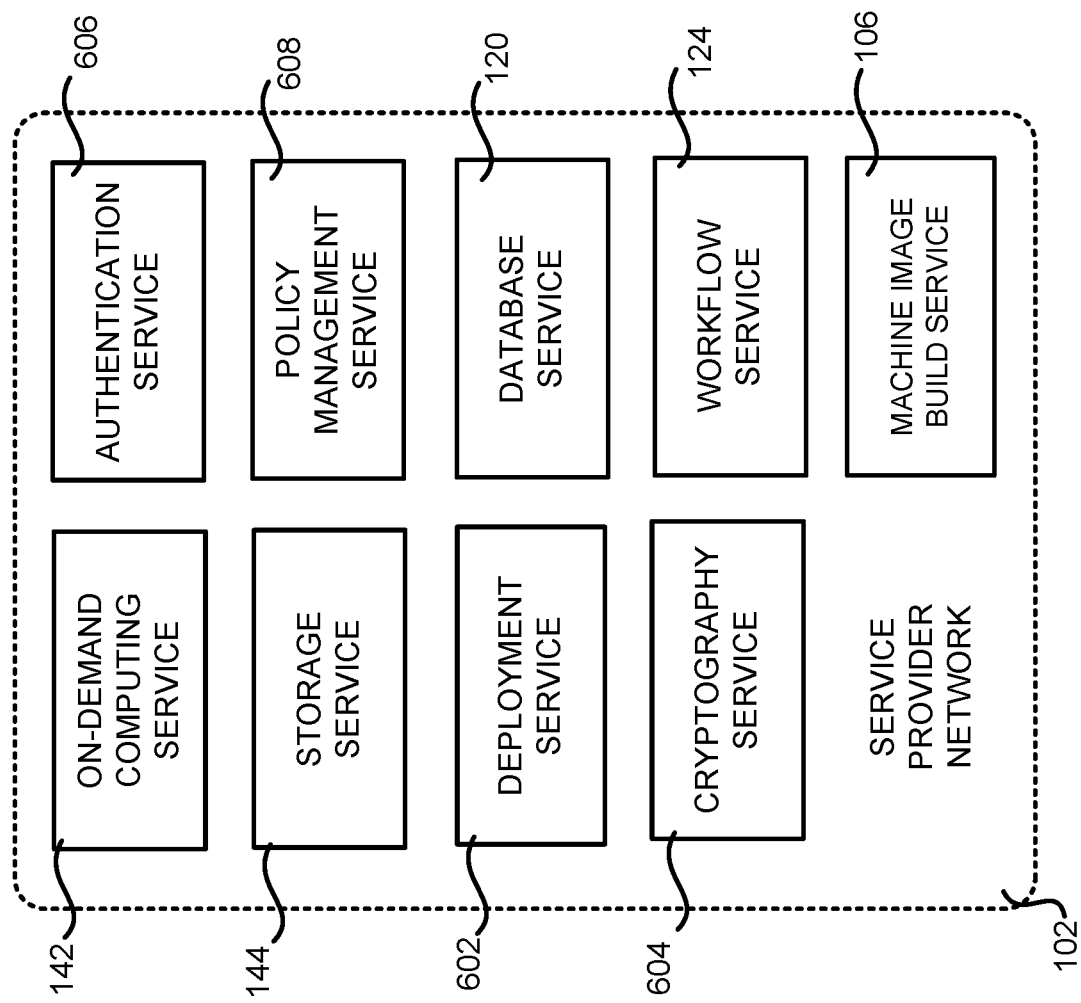
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the machine image build service 106, an authentication service 606, a cryptography service 604, the workflow service 124, a deployment service 602, a policy management service 608, the database service 120, the storage service 144, and the on-demand computing service 142. Additionally, the service provider network 102 can also provide other types of network services, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 402 shown in FIG. 4. Communications from a customer computing device, such as the developer computing device 112 shown in FIG. 1, to the service provider network 102 can cause the services provided by the service provider network 102 to operate in accordance with the described configurations or variations thereof.

It is noted that not all configurations described include the network services shown in FIG. 6 and that additional network services can be provided in addition to or as an alternative to the services explicitly described herein. Each of the services shown in FIG. 6 can also expose web service interfaces that enable a caller to submit appropriately configured API calls to the various services through web service requests. The various web services can also expose GUIs, CLIs, and/or other types of interfaces for accessing the functionality that they provide. In addition, each of the services can include service interfaces that enable the services to access each other (e.g., to enable a VM provided by the on-demand computing service 142 to store data in or retrieve data from the storage service 144). Additional details regarding some of the services shown in FIG. 6 will now be provided.

As discussed above, the on-demand computing service 142 can be a collection of computing resources configured to instantiate VM instances and to provide other types of computing resources 504 on demand. For example, a customer or other user of the service provider network 102 can interact with the on-demand computing service 142 (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 142 is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 144 can include software and computing resources that collectively operate to store data using block or file-level storage devices (and/or virtualizations thereof). The storage devices of the storage service 144 can, for example, be operationally attached to virtual computer systems provided by the on-demand computing service 142 to serve as logical units (e.g., virtual drives) for the computer systems. A storage device can also enable the persistent storage of data used/generated by a corresponding virtual computer system where the virtual computer system service can only provide ephemeral data storage.

The service provider network 102 can also include a cryptography service 604. The cryptography service 604 can utilize storage services of the service provider network 102, such as the storage service 144, to store encryption keys in encrypted form, whereby the keys can be usable to decrypt customer keys accessible only to particular devices of the cryptography service 604. The cryptography service 604 can also provide other types of functionality not specifically mentioned herein.

As illustrated in FIG. 6 and discussed above, the service provider network 102, in various configurations, also includes an authentication service 606 and a policy management service 608. The authentication service 606, in one example, is a computer system (i.e., collection of computing resources 504) configured to perform operations involved in authentication of users. For instance, one of the services shown in FIG. 6 can provide information from a user to the authentication service 606 to receive information in return that indicates whether or not the requests submitted by the user are authentic.

The policy management service 608, in one example, is a network service configured to manage policies on behalf of customers or internal users of the service provider network 102. The policy management service 608 can include an interface that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain a deployment service 602 for deploying program code and/or the database service 120 in some configurations. The deployment service 602 provides functionality for deploying program code, such as to virtual or physical hosts provided by the on-demand computing service 142. As also discussed briefly above, the database service 120 can be a collection of computing resources that collectively operate to create, maintain, and allow queries to be performed on databases stored within the service provider network 102. For example, a customer or other user of the service provider network 102 can operate and manage a database from the database service 120 by utilizing appropriately configured network API calls. This, in turn, can allow the customer to maintain and potentially scale the operations in the database. Other services include the workflow service 124 and the machine image build service 106, both of which were described in detail above, object-level archival data storage services, and services that manage, monitor, interact with, or support other services. The service provider network 102 can also be configured with other network services not specifically mentioned herein in other configurations.

Figure 7:
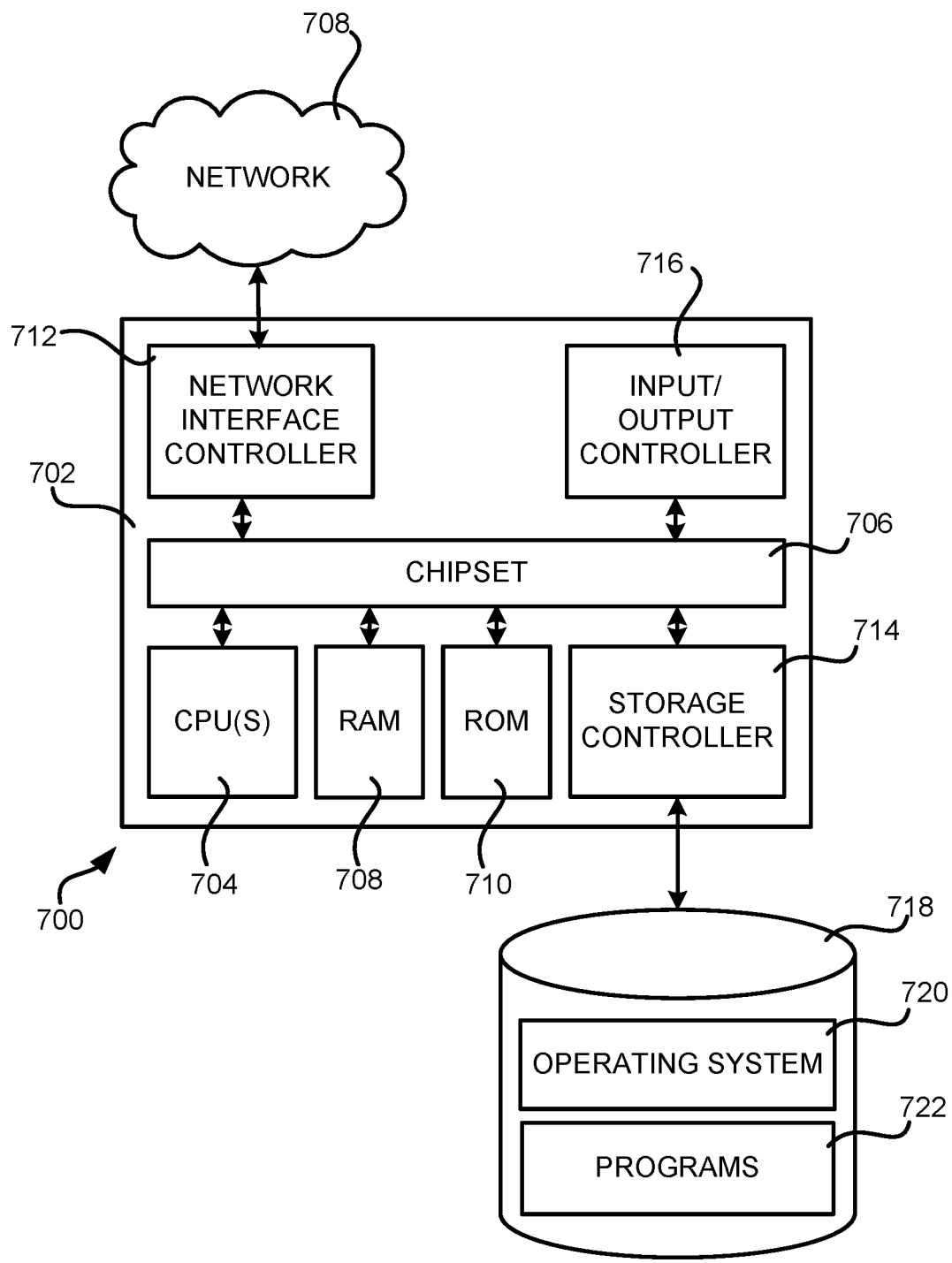
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants, such as but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for generating a machine image from a software package have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
 a processor; and
 a non-transitory computer-readable storage medium having instructions stored thereupon which are executable by the processor and which, when executed, cause the apparatus to:
  execute a machine image build service on one or more computing devices in a service provider network;
  expose a graphical user interface that provides graphical elements to access functionality exposed by the machine image build service, wherein the graphical elements include a first graphical element that is associated with identification of a software package used to build a machine image, and a second graphical element that is associated with identification of an operating system to be used with the machine image;
  receive a request, via the graphical user interface, to generate the machine image from the software package at one or more computing devices of the machine image build service, the request comprising data identifying the operating system to be used with the machine image and the software package; and
  responsive to the request, instantiate a virtual machine on one or more computing devices of an on-demand computing service executing in the service provider network, the virtual machine configured to utilize a base machine image containing the operating system and being configured for compliance with one or more requirements for execution within the service provider network,
  receive, via the graphical user interface, the software package,
  store the software package in a storage service executing in the service provider network,
  install the software package into the virtual machine,
  take a snapshot of the virtual machine to generate the machine image,
  store the machine image in a storage service executing in the service provider network,
  cause one or more computing devices of a machine scanning service to scan the machine image for compliance with the one or more requirements for execution within the service provider network, wherein the machine scanning service performs operations to
   check the machine image for one or more image default passwords, security credentials, or authorization keys, and
   determine that the machine image is compliant with one or more security requirements associated with execution of machine images in the service provider network, wherein the one or more security requirements include a first security requirement that one or more network ports are closed,
   determine that the machine image is compliant with the one or more security requirements, and
  based, at least partly in determining that the machine image is compliant, submit the machine image to a machine image marketplace that makes the machine image, and other machine images submitted by one or more Independent Software Vendors (ISVs), available to customers of the service provider network.

2. The apparatus of claim 1, wherein the request to generate the machine image from the software package further specifies one or more storage volumes provided by the storage service executing in the service provider network to be added to the machine image, and wherein the workflow is further configured to cause the machine image creation tool to configure the virtual machine with the one or more storage volumes.

3. The apparatus of claim 1, wherein the machine image build service is further configured to expose a network services application programming interface (API) for receiving the request to generate the machine image from the software package.

4. The apparatus of claim 1, wherein scanning the machine image for compliance with the one or more requirements for execution within the service provider network comprises determining one or more that a first network port is open, a second network port is closed, and that the machine image authorizes OS-level administration capabilities to allow for compliance requirements, vulnerability updates and log file access.

5. The apparatus of claim 1, wherein the non-transitory computer-readable storage medium has further instructions stored thereupon to:
 further responsive to the request, cause a database service executing in the service provider network to create an entry in a database associated with the request, the entry defining a status of the request.

6. A computer-implemented method for generating a machine image from a software package, the method comprising:
 exposing a graphical user interface that provides a first graphical element associated with identification of a software package used to build a machine image, and a second graphical element associated with identification of an operating system to be used with the machine image;
 receiving, by way of a network services application programming interface (API), a request to generate the machine image from the software package, the request specifying the software package and the operating system for use with the machine image; and
 responsive to the request, causing one or more computing devices of a workflow service executing in a service provider network to execute a workflow, whereby the workflow
  causes a virtual machine to be instantiated using the operating system on one or more computing devices of an on-demand computing service executing in the service provider network, wherein the virtual machine is configured for compliance with one or more requirements for execution within the service provider network,
  causes the software package to be installed in the virtual machine,
  causes a snapshot of the virtual machine to be taken, thereby creating the machine image,
  causes a scan of the machine image for compliance with the one or more requirements for execution within the service provider network, wherein the scan includes checking the machine image for one or more image default passwords, and determining that one or more of a first network port is open, a second network port is closed, and that the machine image authorizes OS-level administration capabilities, and causes the machine image to be submitted to a machine image marketplace that makes the machine image, and other machine images submitted by one or more Independent Software Vendors (ISVs), available to customers of the service provider network.

7. The computer-implemented method of claim 6, further comprising storing the machine image using a storage service executing in the service provider network.

8. The computer-implemented method of claim 6, wherein the request to generate the machine image from the software package further specifies one or more storage volumes provided by a storage service executing in the service provider network to be added to the machine image, and wherein the workflow is further configured to cause the virtual machine to be configured with the one or more storage volumes.

9. The computer-implemented method of claim 6, wherein the scan further comprises checking the machine image for one or more security credentials, or authorization keys.

10. The computer-implemented method of claim 6, further comprising causing a database service executing in the service provider network to create an entry in a database associated with the request, the entry defining a status of the request.

11. The computer-implemented method of claim 10, wherein the status of the request indicates that building of the machine image was successful, building of the machine image failed, scanning of the machine image by a machine image scanning service was successful, or scanning of the machine image by the machine image scanning service was unsuccessful.

12. The computer-implemented method of claim 6, further comprising causing the on-demand computing service to instantiate a second virtual machine using the machine image.

13. The computer-implemented method of claim 12, wherein a management console is configured to provide the graphical user interface for specifying the operating system and the software package.

14. A non-transitory computer-readable storage medium having instructions stored thereupon which are executable by a processor and which, when executed, cause the processor to:

receive, at a network services application programming interface (API) exposed by one or more computing devices of a network service executing in a service provider network, a request to generate a machine image from a software package, the request identifying the software package and an operating system for use with the machine image, wherein the software package is specified using a first element of a graphical user interface, and the operating system is specified using a second element of the graphical user interface; and transmit an instruction to one or more computing devices of a workflow service also executing in the service provider network to execute a workflow configured to cause one or more computing devices of an on-demand computing service also executing in the service provider network to instantiate a virtual machine with the operating system, the virtual machine being configured for compliance with one or more requirements for execution in the service provider network, cause the software package to be installed in the virtual machine, cause a snapshot of the virtual machine to be taken, thereby creating the machine image, cause a scan of the machine image for compliance with the one or more requirements for execution within the service provider network, wherein the scan includes checking the machine image for one or more authorization credentials, and determining that one or more of a first network port is open, a second network port is closed, and that the machine image authorizes OS-level administration capabilities, and cause the machine image to be submitted to a machine image marketplace that makes the machine image, and other machine images submitted by one or more Independent Software Vendors (ISVs), available to customers of the service provider network.

15. The non-transitory computer-readable storage medium of claim 14, wherein the request to generate the machine image from the software package further identifies one or more storage volumes provided by a storage service executing in the service provider network to be added to the machine image, and wherein the workflow causes the virtual machine to be configured with the one or more storage volumes.

16. The non-transitory computer-readable storage medium of claim 14, wherein the scan further comprises checking the machine image for one or more image default passwords, or authorization keys.

17. The non-transitory computer-readable storage medium of claim 14, having further instructions stored thereupon to cause a database service executing in the service provider network to create an entry defining a status of the request in a database associated with the request.

18. The non-transitory computer-readable storage medium of claim 17, wherein the status indicates that building of the machine image was successful, building of the machine image failed, scanning of the machine image by a machine image scanning service was successful, or scanning of the machine image by the machine image scanning service was unsuccessful.

19. The non-transitory computer-readable storage medium of claim 14, wherein the request to generate the machine image from the software package is received from a management console configured to provide the graphical user interface for specifying the operating system and the software package.

20. The non-transitory computer-readable storage medium of claim 14, having further instructions stored thereupon to store the machine image using a storage service executing in the service provider network.

* * * * *